March 25, 1969
H. E. HUNLEY
3,435,322
DC VOLTAGE REGULATOR UTILIZING PHASE
CONTROLLED RECTIFYING MEANS
Filed Dec. 23, 1966
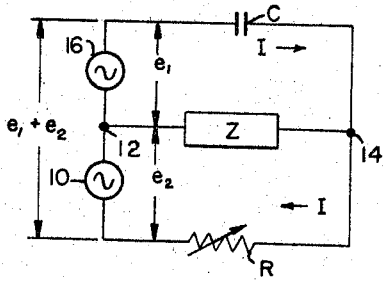
Fig. 1.
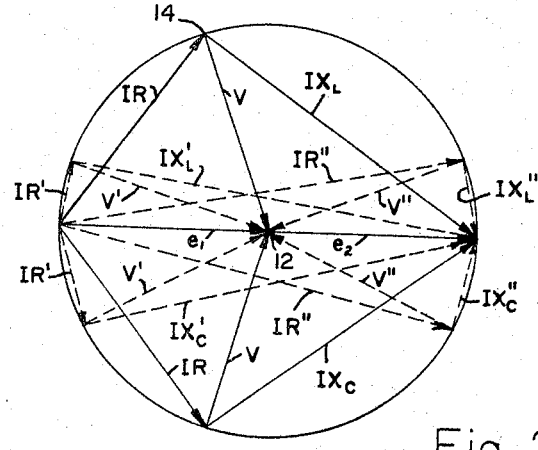
Fig. 2.
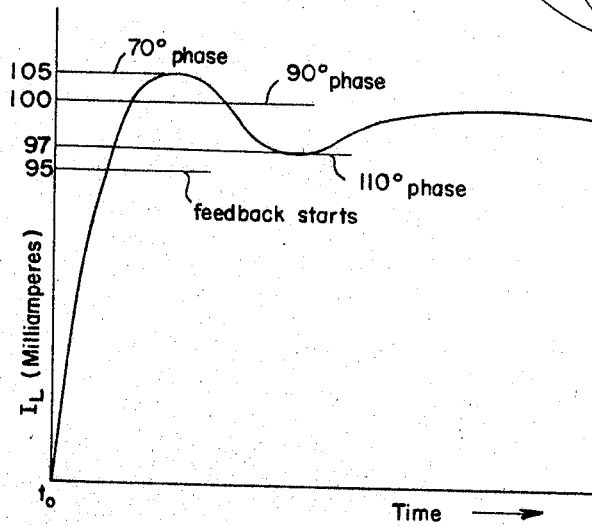
Fig. 5.
Fig. 7.
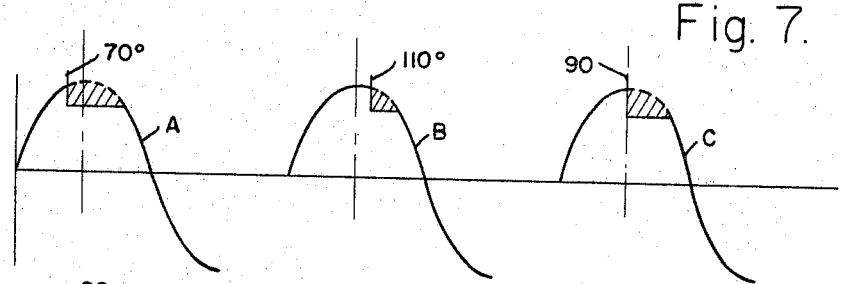
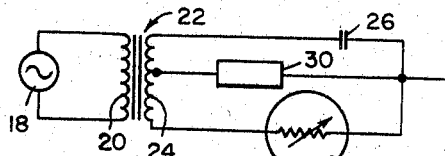
Fig. 3.
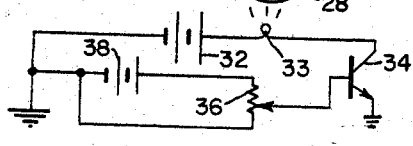
Homer E. Hunley,
INVENTOR.
BY Jerry A. Dinardo
AGENT.

Homer E. Hunley,
INVENTOR

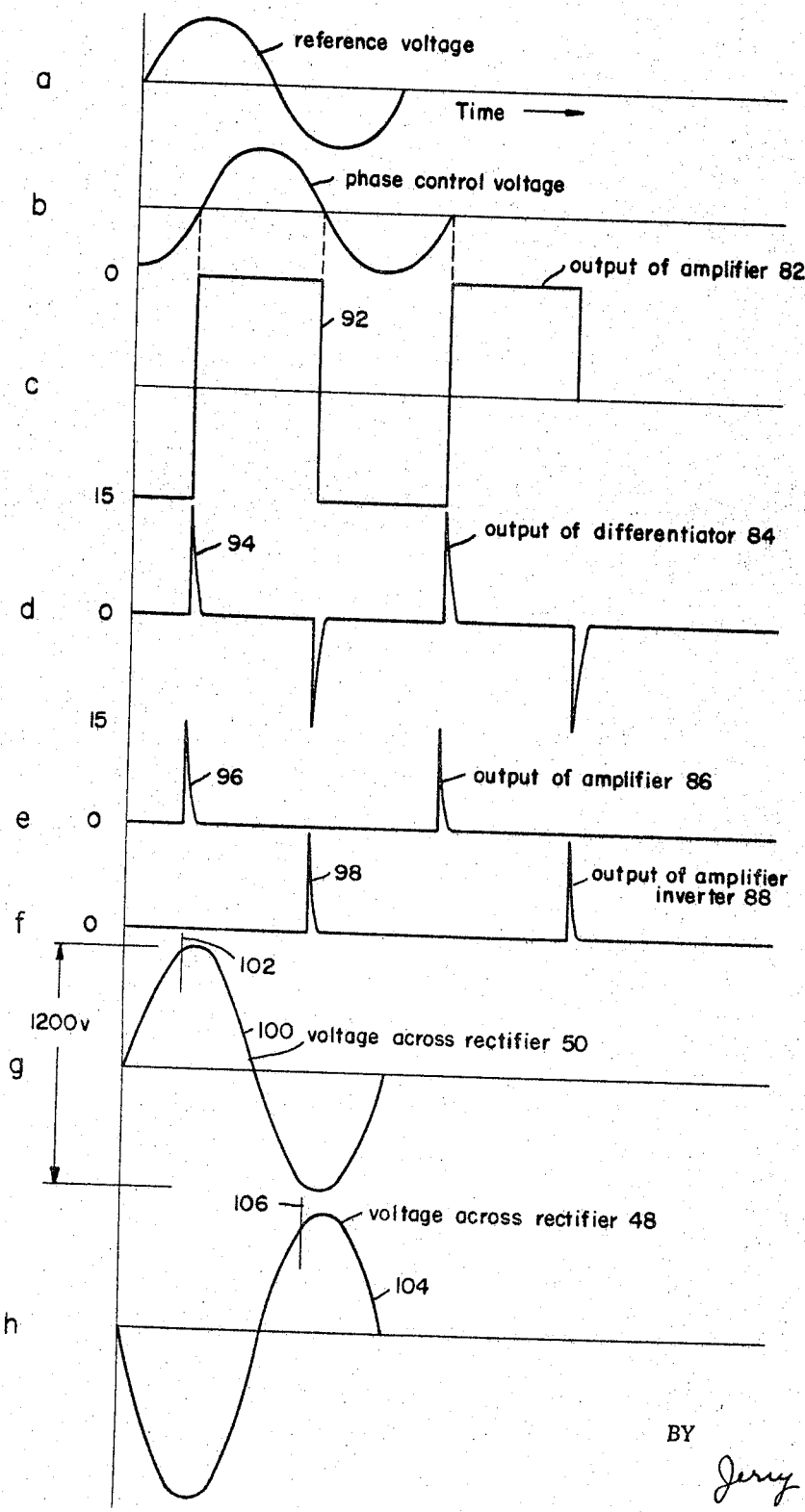

United States Patent Office 3,435,322
Patented Mar. 25, 1969

3,435,322
DC VOLTAGE REGULATOR UTILIZING PHASE CONTROLLED RECTIFYING MEANS
Homer E. Hunley, Hawthorne, Calif., assignor to TRW Inc., Redondo Beach, Calif., a corporation of Ohio
Filed Dec. 23, 1966, Ser. No. 604,334
Int. Cl. H02m 1/08
U.S. Cl. 321—18          6 Claims

ABSTRACT OF THE DISCLOSURE

A phase shift control circuit includes a reference alternating voltage connected to the primary of a transformer. The secondary of the transformer has a center tap. One half of the transformer secondary is connected in series with a photoresistor and the other half is connected in series with a reactive impedance. The reactive impedance and photoresistor are connected at a junction. A lamp is connected in a direct current circuit so that small fluctuations in the direct current produce fluctuations in the light emitted by the lamp. The lamp is optically coupled to the photoresistor so that the light fluctuations cause variations in the resistance of the photoresistor. The resistance of the photoresistor can be varied in a range between 1/100 to 100 times the reactive impedance. Over the range of resistance variations the phase of the alternating voltage between the secondary transformer center tap and the junction of the photoresistor and reactive impedance, relative to the phase of the reference voltage, varies between 0° and 180°.

BACKGROUND OF THE INVENTION

Field of the invention

This invention relates to phase shift control circuits and more particularly to means for utilizing the phase shift in one circuit to control the power supplied in another circuit to a load.

Description of the prior art

Electronically controllable phase shifting networks are known in which an input signal is applied across a voltage dividing network having a center tap. Across the voltage dividing network is connected the combination of two impedance elements, one of which is resistive and the other reactive. By changing the impedance of the resistive element, the phase of the voltage between the junction of the two impedance elements and the center tap, relative to the input signal, may be varied without changing the amplitude of that voltage. For example, U.S. Patent No. 2,414,475 discloses an arrangement wherein the variable resistive element is constituted by a vacuum tube triode, the effective resistance of which is varied by an alternating current signal.

In many applications, it may be desired to effect by electronic means a similar phase shift control by varying a small direct current signal rather than an alternating current signal.

SUMMARY OF THE INVENTION

In accordance with the invention, a first source of alternating voltage is connected in a first branch in series with a variable resistive impedance across a pair of terminals. A second source for producing a second alternating voltage in phase with said first voltage is connected in a second branch in series with a reactive impedance across said pair of terminals.

A direct current circuit is coupled to the resistive impedance so that direct current signal variations produce corresponding impedance changes in the resistive impedance. Changes in the resistive impedance over a range between 1/100 and 100 times that of the reactive impedance cause the phase of the alternating voltage across said pair of terminals relative to that of said first and second alternating voltages to change over a range from 0° to 180°.

BRIEF DESCRIPTION OF THE DRAWING

In the drawing:
FIG. 1 is a schematic diagram of a well-known circuit embodying some of the principles used in the invention;
FIG. 2 is a phase diagram useful in understanding the operation of the circuit of FIG. 1;
FIG. 3 is a schematic diagram of a phase control circuit constructed according to the invention;
FIG. 5 is a graph of load current versus time for the circuit of FIG. 4;
and
FIG. 6 and 7 are graphs of waveforms illustrating the operation of the circuit of FIG. 4.

DESCRIPTION OF THE PREFERRED EMBODIMENTS

Figure 4:
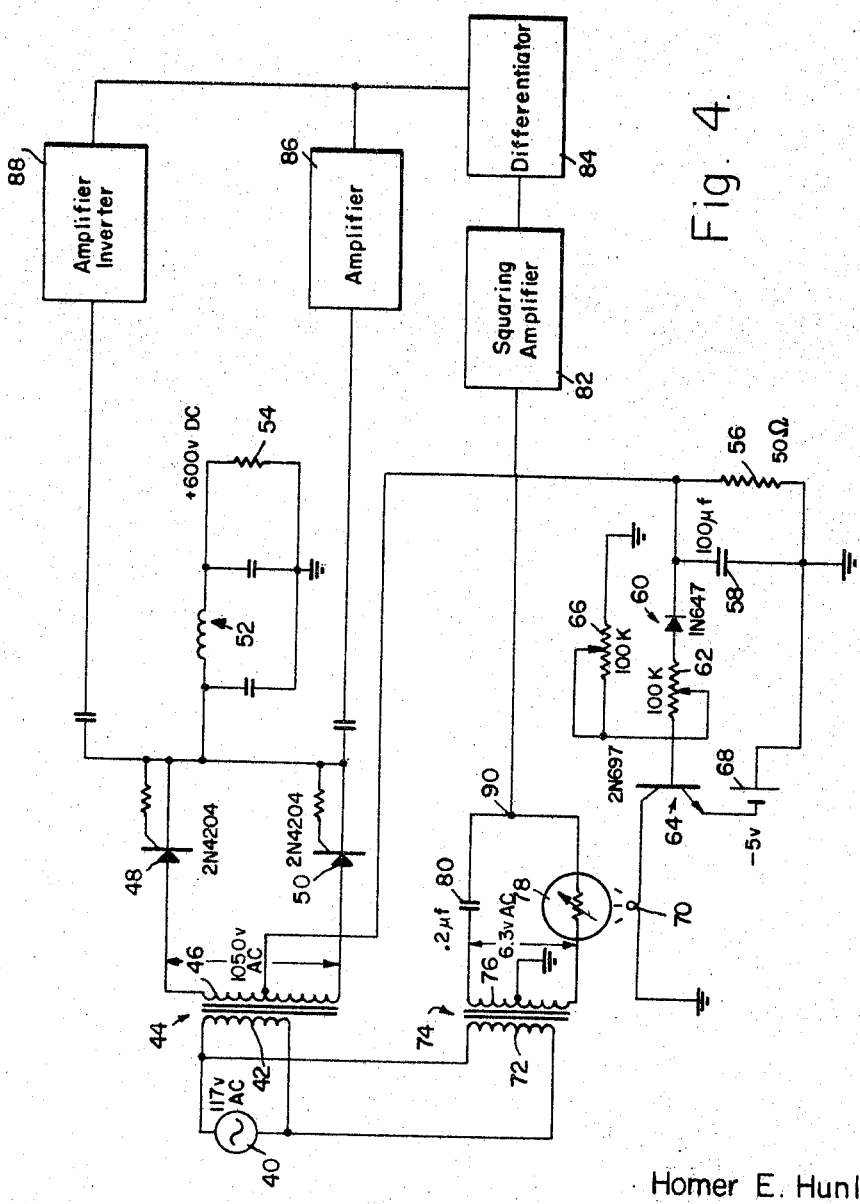
FIG. 4 is a schematic diagram of a direct current power supply embodying a phase control circuit in a feedback arrangement to limit the power supply current.

For an understanding of some of the principles upon which the invention is based, reference is now made to the well-known circuit of FIG. 1. In FIG. 1, there is shown a first source 10 of sinusoidal alternating voltage $e_1$ connected in series with a variable resistor R across a pair of terminals 12 and 14. A second source 16 of alternating voltage $e_2$ is connected in series with a reactive element, such as a capacitor C, across the terminals 12 and 14. The voltages $e_1$ and $e_2$ are equal, have the same frequency, and are in phase.

A load impedance Z is connected across the terminals 12 and 14. The impedance Z is substantially larger, say by 100 times, than that of both the resistor R and capacitor C. Accordingly, for practical purposes the same current I flows through both the capacitor C and resistor R. The current I leads the voltages $e_1$ and $e_2$ by some phase angle determined by the impedance of the resistor R and capacitor C.

Reference is now made to the lower half of the phase diagram of FIG. 2, which shows the phases of the voltages in the circuit of FIG. 1. The vectors in solid lines indicate phase and amplitude of the voltages when the resistance R has an impedance value slightly less than that of the capacitor C. The source voltages $e_1$ and $e_2$ are in phase and equal. The voltage IR across the resistor R leads the voltages $e_1$ and $e_2$ by some angle less than 90°. The voltage $IX_c$ across the capacitor C lags the voltage IR across the resistor R by 90°. The voltage V across the load impedance Z between terminals 14 and 12 lags the voltages $e_1$ and $e_2$ by an angle between 45° and 90°.

If the resistance of resistor R is reduced to a small value, the voltage IR' across the resistor R is reduced and the phase angle of the voltage IR' is increased. The voltage $IX_c'$ across the capacitor C is increased. The phase angle of the voltage V' across the load impedance Z is reduced, but the amplitude remains the same. It is seen that if the resistance of the resistor R is reduced to a value substantially less than the impedance of the capacitor C, say $1/100$ times the value, the voltage across the load impedance Z will be substantially in phase with the voltages $e_1$ and $e_2$, but the amplitude of the voltage will remain constant.

On the other hand, if the resistance of the resistor R is increased to a high value, the voltage $IR''$ thereacross will increase, the voltage $IX_C''$ across the capacitor C will decrease, and the phase angle of the voltage $V''$ across the load impedance Z will increase. It is seen then if the resistance of the resistor R is increased to a value substantially greater than the impedance of the capacitor C, say 100 times the value, the voltage across the load impedance Z will be substantially 180° out of phase with the voltages $e_1$ and $e_2$, but the amplitude of the voltage will remain constant.

Similar results can be produced by replacing the capacitor C with an inductance L, except that the vectors will be those as shown in the upper half of the phase diagram of FIG. 2. In the latter case, the voltages across the inductance L will be those identified as $IX_L$, $IX_L'$ and $IX_L''$.

According to the invention, circuit means are provided for varying the resistance of resistor R with a small direct current to produce changes in phase of the voltage across the load impedance Z which vary from 0° to 180° relative to the input or reference voltage. Such a circuit means is shown in FIG. 3.

Referring now to FIG. 3, there is shown an alternating current source 18, as a 60 cycle supply, supplying a reference voltage to the primary winding 20 of a transformer 22. The secondary winding 24 of the transformer 22 is center tapped. Each half of the secondary winding 24 supplies in phase voltages to a reactive impedance or capacitor 26 and a light sensitive variable resistor or photoconductive cell 28 connected in series. A load impedance 30 is connected between the center tap of the secondary winding 24 and the junction of the capacitor 26 and the photoconductive cell 28, which will be referred to hereinafter as a photoresistor.

For varying the resistance of the photoresistor 28, a lamp 33 is optically coupled thereto. The lamp 33 is connected in a direct current circuit in series with a direct current voltage supply 32 and the emitter-collector circuit of an NPN transistor 34. The base of the transistor 34 is connected to a variable bias supply, which includes a potentiometer 36 and a direct current voltage supply 38.

In operation, a small change in the emitter-base current of the transistor 34 will produce a corresponding larger change in the emitter-collector current. For example, if the voltage on the base of the transistor 34 is increased, a larger emitter-base current will flow which causes a larger emitter-collector current. Since the emitter-collector current flows through the lamp 30, the latter will emit more light. With more light shining thereon, the resistance of the photoresistor 28 will reduce to cause a change in the phase of the voltage across the load impedance 30. As will be seen from the phase diagram of FIG. 2, if the resistance of the photoresistor 28 is reduced to a low value, say $1/100$ of the impedance of the capacitor 26, the voltage across the load impedance 30 will be in phase with the voltages in the secondary winding 24 and the primary or reference voltage.

On the other hand, if the voltage on the base of the transistor 34 is reduced to a low value, the emitter-base and emitter-collector currents will reduce to cause the lamp 30 to emit less light and even extinguish. The resistance of the photoresistor 28 will increase to a high value, say 100 times that of the impedance of the capacitor 26. Under this condition, the voltage across the load impedance 30 will be 180° out of phase with the reference voltage, as can be seen from the phase diagram of FIG. 2.

The phase shifted signal produced by the circuit of FIG. 3 can be used to trigger a triggerable switching device so that the power fed to a load through the triggered switch can be controlled by a small direct current signal.

The phase shift circuit of FIG. 3 can be used in a feedback arrangement to form a power regulator or current limiter. Such an arrangement is shown in FIG. 4.

Referring now to FIG. 4, a reference source 40 of sinusoidal voltage, such as a 117 volt, 60 cycle supply, is connected to the primary winding 42 of a transformer 44. The secondary winding 46 is connected in a full wave rectifier circuit which includes silicon controlled rectifiers or thyristors 48 and 50 in each half of the secondary winding 46. The silicon controlled rectifiers 48 and 50 will rectify when a voltage pulse exceeding a certain threshold is applied to the cathodes thereof.

The rectified output is passed through a filter network 52 which gives a smooth direct current output. The direct current is applied to a resistive load 54 and a current monitor 56 of much smaller resistance value than the load 54. A filter capacitor 58 is connected across the current monitor 56.

The current monitor 56 is connected to the cathode of a threshold detector or diode 60. The anode of the threshold diode 60 is connected through a feedback control resistor 62 to the base of an NPN transistor 64. The base of the transistor is connected through a bias resistor 66 to ground. The emitter of the transistor 64 is connected to a negative voltage supply 68. The collector of the transistor is connected in series with a lamp 70.

The reference supply 40 is also connected to the primary winding 72 of a second transformer 74. The secondary winding 76 of the transformer is connected in a phase control circuit of the kind previously described in connection with FIG. 3. The phase control circuit includes a photoresistor 78 and a capacitor 80 connected in series across the secondary winding 76. The lamp 70 is optically coupled to the photoresistor 78.

The output of the phase control circuit is fed to a squaring amplifier 82 which converts the sinusoidal input to a square wave. The squaring amplifier 82 may be a high gain class C transistor amplifier. The square wave output is fed to a differentiator 84 which produces a train of alternating positive and negative pulses. The differentiator pulses are fed to an amplifier 86 which detects and amplifies the positive pulses. The amplified positive pulses are fed to the gate electrode of one of the silicon controlled rectifiers 50. The differentiated pulses are also fed to an amplifier inverter 88 which detects the negative pulses and amplifies and inverts them to positive pulses. The positive pulses from the amplifier inverter 88 are fed to the gate electrode of the other silicon controlled rectifier 48.

The silicon controlled rectifiers 48 and 50 conduct current only when a positive pulse is applied to the gate electrodes during a positive voltage excursion on the anodes thereof. As will be seen, the phase control circuit determines the phase of the control pulses relative to the sinusoidal supply voltage and thereby controls the output direct current voltage to provide a current limiting action on the load.

The operation of the circuit of FIG. 4 will now be described. The circuit values appearing on the drawing are exemplary and are given for ease in describing the operation. It will be assumed that the reference voltage source 40 has just been turned on. Referring to the graph of waveforms of FIG. 5, at zero time $t_0$, the load current $I_L$ through the load 54 is zero. At zero time $t_0$, due to the 5 volt negative bias on the emitter of the transistor 64, a small electron current of about 0.1 milliampere is flowing through the emitter-base junction, causing about a 0.7 volt drop thereacross. Accordingly, an amplified current of about 10 milliamperes will flow through the emitter-collector junction and through the lamp 70 to cause the photoresistor 78 to assume a resistance value that places the output voltage at junction point 90 of the phase control circuit at a phase that lags the reference voltage by about 70°.

Referring to the graph of FIG. 6, line (a) depicts the reference voltage and line (b) depicts the phase control voltage at junction point 90. The sinusoidal phase control voltage is fed to the squaring amplifier 82 to produce a square wave output 92 shown in line (c). The square wave ouptut 92 is fed to the differentiator 84 to produce the pulse waveform 94 shown in line (d). The differentiated output 94 passes through the amplifier 86 to produce the positive control pulses 96 shown in line (e) and through the amplifier inverter 88 to produce the other positve control pulses 98 shown in line (f) that are 180° out of phase with the pulses 96 shown in line (e).

The control pulses 96 and 98 are fed to the gate electrodes of the rectifiers 50 and 48 respectively. The control pulses 96 cause the rectifier 50 to rectify the sinusoidal waveform 100 appearing thereacross at the 70° points of the positive voltage swing. On waveform 100, shown in line (g), this is shown as occurring at point 102. The other control pulses 98 cause the other rectifier 48 to rectify the sinusoidal waveform 104 appearing thereacross at the 70° points of its voltage swing. On waveform 104, shown in line (h), this is shown as occurring at point 106. The control pulses 96 and 98 are about 10 volts in amplitude.

When rectification occurs, a direct current output voltage appears across load resistor 54 and the load current $I_L$ builds up. As soon as the load current builds up to about 95 milliamperes, the voltage across the current monitor resistor 56 reaches about —5 volts direct current. Since the anode of the threshold diode 60 is —4.3 volts, the latter will conduct current through the feedback control resistor 62.

Current flowing through the feedback resistor 62 in the direction through the emitter-base junction of the transistor 64 will be in opposition to the current flowing from the emitter-base junction through the bias resistor 66. Accordingly, since the current through the emitter-base junction is decreased, the current through the emitter-collector junction will decrease and less current will flow through the lamp 70.

With less light being emitted by the lamp 70, the resistance of the photoresistor 78 will increase so as to change the phase of the control voltage at junction point 90. The phase control voltage will lag the reference voltage even further, say by 110°. The control pulses 96 and 98 will also occur later in time, at the 110° phase points. When rectification occurs at the 110° points the output voltage will decrease and tend to reduce the load current $I_L$.

To illustrate how the change in phase of the control pulses 96 and 98 operates to change the output voltage, reference is made to the graph of waveforms shown in FIG. 7. Waveform A shows the effect of rectification at the 70° points, waveform B shows the effect of rectification at the 110° points, and waveform C shows the effect of rectification at the 90° points. The shaded areas represent the energy suplied to the filter network 52. It is seen that the shaded area is greatest in waveform A, is less in waveform C, and is the smallest in waveform B. Thus the energy and voltage will be greatest at 70°, will diminish at 90°, and will be still less at 110°.

During the aforementioned regulatory process, however, and due to the time lag for the circuit to adjust to the changing conditions, the load current $I_L$ will have increased beyound 95 milliamperes, say to 105 milliamperes as shown in FIG. 5. Thus the change in phase from 70° to 100° tends to reduce the load current from 105 milliamperes to say 97 milliamperes. Where the phase was 70° at 105 milliamperes load current, the phase at 97 milliamperes is now 110°.

The decrease in load current causes the feedback loop to operate in the opposite sense from that described previously. Thus, an oscillation in the load current would tend to develop. However, the feedback resistor 62 is chosen to be large enough so that the gain of the entire feedback loop is less than unity. Accordingly, the phase of the control pulses 96 and 98 levels off say at 90°, with a load current of 100 milliamperes.

Under the stable conditions, the load current will be limited to 100 milliamperes, and the current through the lamp 70 is about 8 milliamperes. The emitter-base current of the transistor 64 is reduced to 108 milliamperes due to the presence of feedback current in the emitter-base circuit.

The feedback loop will now operate to regulate the load current when either an increase or decrease in the supply voltage occurs. If an increase in alternating current supply voltage occurs, the load current will tend to increase. The feedback loop will change the phase of the control pulses in a sense to cause the direct current output voltage to reduce, thereby tending to reduce the load current and opposing its tendency to increase. Conversely, if the alternating current suply voltage decreases the load current will tend to decrease. The feedback loop will change the phase of the control pulses in a sense to cause the direct current output voltage to increase, thereby tending to increase the load current and opposing its tendency to decrease.

While the varible resistive member in the foregoing embodiments has been described as being a photosensitive resistor, it is apparent that other kinds of variable resistors may be used which are subject to resistance variation by means of direct current signal variations. One of these may be a magnetoresistor, which is a solid state device in which the electrical resistance is a function of an applied magnetic field density. Thus a direct current through an electromagnet will allow the resistance to be controlled. The change in resistance is linear with respect to the induced magnetic field. Such a solid state device is usually of low impedance, ranging from one ohm with no magnetic field, to 25 ohms with 22 kilogauss applied.

The embodiments of the invention in which an exclusive property or privilege is claimed are defined as follows:

1. A direct current power supply, comprising:
   a source of reference alternating voltage;
   means for rectifying and filtering said alternating voltage to produce a direct current voltage across output terminals;
   a load impedance connected to said output terminals for drawing load current;
   a feedback circuit for limiting said load current to predetermined values, and including;
   a source for producing a second alternating voltage in phase with said reference voltage and a variable resistive impedance connected in series in a first branch across a pair of terminals;
   a source for producing a third alternating voltage in phase with said second voltage, and a reactive impedance connected in series in a second branch across said pair of terminals;
   means responsive to changes in the level of said load current and coupled between said load impedance and said resisive impedance for altering the impeddance of the latter relative to that of said reactive impedance so as to alter the phase of the alternating voltage across said pair of terminals relative to that of said second and third alternating voltages;
   means for deriving trigger pulses from the alternating voltage across said pair of terminals;
   and means for applying said trigger pulses to said rectifying means to cause rectification of said reference alternating voltage in phase with the alternating voltage across said pair of terminals.

2. The invention according to claim 1, wherein said rectifying means includes a pair of silicon controlled rectifiers connected in a full wave rectifying circuit.

3. The invention according to claim 2, wherein said trigger pulse means comprises means for producing two trains of trigger pulses separated in phase by 180°, and further including means for applying one pulse train to one rectifier of said pair and for applying the other pulse train to the other rectifier of said pair.

4. The invention according to claim 1, wherein said load current responsive means comprises a transistor amplifier for coupling changes in said load current above a certain threshold level to a resistance varying device, and means for coupling said resistance varying device to said variable resistive impedance to vary the resistance of the latter in response to said load current changes.

5. The invention according to claim 4, wherein said resistance varying device comprises a lamp, and said variable resistive impedance comprises a photoresistor optically coupled to said lamp.

6. The invention according to claim 4, wherein said reactive impedance comprises a capacitor.

References Cited
UNITED STATES PATENTS

| | | | |
|---|---|---|---|
| 2,728,887 | 12/1955 | Rockafellow | 321—16 XR |
| 3,070,739 | 12/1962 | Hansen et al. | 321—47 |
| 3,157,821 | 11/1964 | Passmore et al. | 250—210 XR |
| 3,233,165 | 2/1966 | Bedford | 321—18 XR |

JOHN F. COUCH, *Primary Examiner.*

W. M. SHOOP, JR., *Assistant Examiner.*

U.S. Cl. X.R.

250—210; 321—47; 323—34